July 16, 1963  Z. M. ROEHR  3,097,647
SURGICAL APPARATUS
Filed Sept. 12, 1958
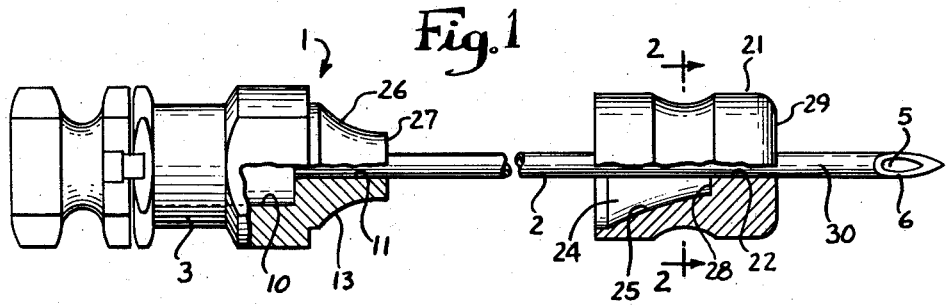
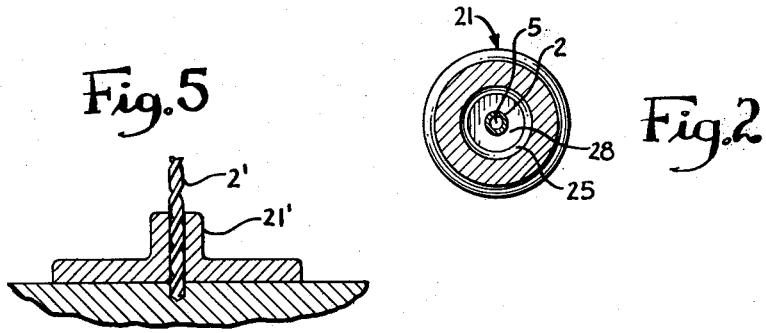
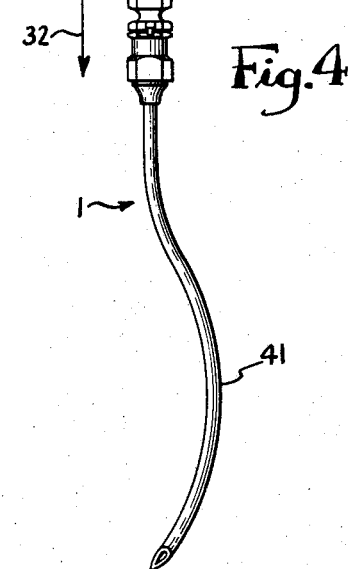
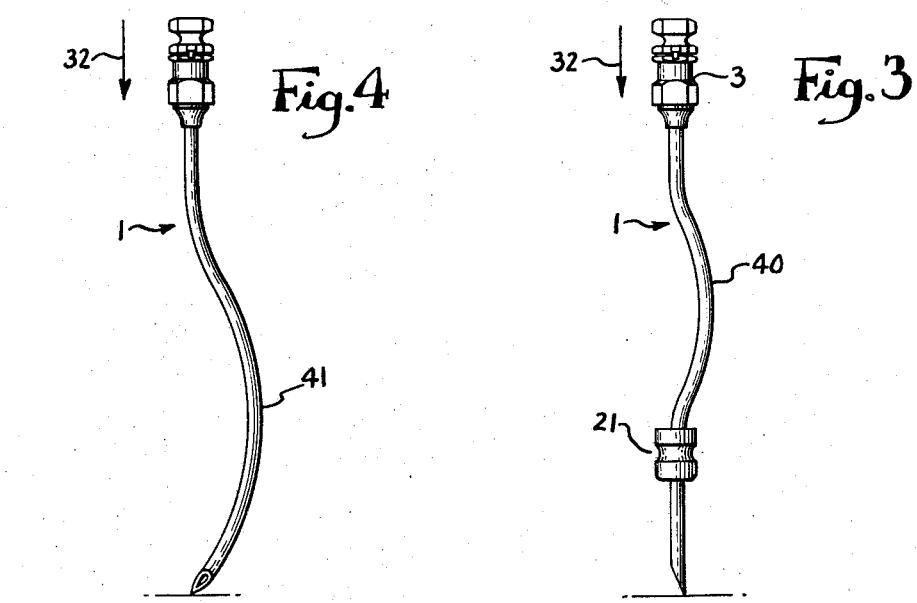
INVENTOR
ZBISLAW M. ROEHR
by: *Morris Spector*
ATTY.

3,097,647
SURGICAL APPARATUS
Zbislaw M. Roehr, Deland, Fla., assignor, by mesne assignments, to Brunswick Corporation, Chicago, Ill., a corporation of Delaware
Filed Sept. 12, 1958, Ser. No. 760,614
1 Claim. (Cl. 128—221)

This invention relates to hypodermic needles and more particularly to needles that are comparatively long, as those used for deep penetration, for instance, a needle used for making a spinal penetration.

When a piercing or penetrating instrument, such as for instance a hypodermic needle, or a surgical drill such as a "Steinman Drill" is to be inserted deeply into the human body, it is important that the ultimate position of the penetrating point of the instrument terminate at a specific location in the body. This means that the direction of travel of the instrument into the body must be controlled. In dealing with short instruments the control of the direction of travel of the penetrating point is a comparatively simple matter. In dealing with long instruments this becomes a problem because of the possibilities of buckling or flexing of the instrument either at the time of the initial penetration or during the subsequent penetrating movement. Such buckling changes the angle of the instrument at the place of penetration into the body and therefore changes the direction of travel of the penetrating point. Merely to increase the wall thickness of the instrument for the purpose of strengthening it against buckling is not a satisfactory solution of the problem.

It is one of the objects of the present invention to provide a penetrating instrument such as a hypodermic needle or a surgical drill with means for maintaining the angle between the instrument and the body being penetrated as the instrument is being forced into the body.

It is a further object of the present invention to provide a penetrating instrument such as a hypodermic needle or a surgical drill with means for guiding it against buckling as it is being forced into the body.

It is a still further object of the present invention to provide a surgical instrument such as a hypodermic needle or a surgical drill with means for holding the penetrating point thereof at the precise point on the body where penetration is desired and at the desired angle thereto as force is being applied to it to effect penetration.

The attainment of the above and further objects of the present invention will be apparent from the following specification taken in conjunction with the accompanying drawing forming a part thereof.

In the drawing:

FIG. 1 is a front view, in partial section, of a hypodermic needle embodying the present invention;

FIG. 2 is a transverse sectional view taken along the line 2—2 of FIG. 1;

FIG. 3 is a diagrammatic view illustrating possible deflection of a spinal needle of the present invention during operation;

FIG. 4 is a view similar to FIG. 3 illustrating possible deflection of a conventional spinal needle without a guide, during operation, and FIG. 5 is a fragmentary sectional view illustrating a modified construction.

In the accompanying drawings like reference numerals designate like parts throughout.

A spinal needle, indicated in general by the reference numeral 1, includes a cannula 2 of conventional construction and a hub 3 also of conventional construction. The cannula 2 is made of stainless steel tubing. In this instance it is a 20 gauge tube. The cannula was, in this instance 3½ inches long. The cannula has a conventional bore 5 extending longitudinally therethrough and a conventional penetrating point 6. The hub 3 is permanently secured to the cannula in any desired manner. The hub 3 has a longitudinal bore 10 at one end terminating in a reduced diameter bore 11 at the other end into which the needle extends. The hub has a short stem portion 13 that provides a body of metal for securing the hub to the cannula.

A slide 21, in the form of a bushing, is slidable on the cannula. The bushing may be made of any desired material, for instance, a plastic material, and may be of any desired external shape that can be gripped by two fingers of one hand. It includes a bore 22 through which the cannula extends, which bore makes a rather snug fit on the cannula while permitting longitudinal sliding of the bushing on the cannula. The length of the bore 22 is such as to provide a guide of suitable length for the cannula when the bushing is manually held whereby the longitudinal axis of the cannula at the bushing is maintained coincident with the longitudinal axis of the bore 22. The bore 22 opens into a larger bore 24 that has a surface 25 which is a counterpart of the surface 26 of the portion 13 of the hub, so that the bushing may be slid into a position making a telescoping fit over the portion 13 of the hub. In this position the portion 13 fits into the bore 24, and the end 27 of the hub is spaced slightly from the internal cylindrical surface 28 of the bushing. The end surface 29 of the bushing is a substantially planar surface, in a plane at right angles to the longitudinal axis 30 of the cannula.

An explanation will now be given of the mode of operation of the needle of the present invention. The bushing 21 may be slid on the cannula to bring it over the penetrating point with the surface 29 laid flush on the surface to be pierced by the needle, or if desired, the bushing 21 may be held by the operator's fingers a slight distance short of the penetrating point 6 so that the penetrating point projects beyond the bushing, thus permitting the operator free manipulation to determine the point of puncture to which the penetrating point is to be applied. Thereafter, while the operator is firmly holding the bushing between the fingers of one hand the operator uses the other hand to cause the hub to exert force in the direction of the arrow 32 on the cannula to move the penetrating point of the cannula into the surface to be penetrated. If the cannula piercing point encounters resistance as it moves into the tissue to be penetrated, there may be a deflection of the cannula between the hub and the bushing as indicated at 40 in FIG. 3. The portion of the cannula extending past the bushing 21 towards the penetrating point is however straight and travels into the tissue being penetrated at the desired angle at the point of puncture. In the absence of such a bushing, if the penetrating point meets resistance to penetration, the force applied by the operator to the hub in the direction of the arrow will tend to cause the cannula to deflect as indicated at 41 in FIG. 4. This deflection results in a loss of control of the angle of penetration of the point of the cannula or the angle of travel of the point of the cannula within the tissue after penetration.

Because the present invention permits guiding of the penetrating point of the needle, against deflection between the guiding point and the penetrating point, it therefore permits the use of smaller gauges of needles than the ones that are in common use without the additional bushing herein described.

While I have herein shown the structure of FIG. 1 as being a hypodermic needle, it is clear from the description thus far given that this structure may be any surgical penetrating instrument which is of small thickness in relation to its length and therefore subject to a possible flexing or bowing. For instance, certain surgical drills such as are used for deep drilling into bones such as by way of example the "Steinman Drill," are of small diameter in relation to their length and are therefore subject to flexing. The invention heretofore described may therefore be used for guiding a "Steinman Drill." This is illustrated in FIG. 5. In this figure there is provided a slide or bushing 21' that may be similar to the bushing 21 or may have a much wider base, as shown. The bushing 21' may be gripped by the fingers of the operator and held in position to hold the end of a drill 2' in position. The drill 2' may be a drill which is of a very small diameter in relation to its length and of the kind used in surgical drilling, namely, a "Steinman Drill." The bore in the bushing 21' is a small amount larger in diameter than the diameter of the drill to permit a free sliding movement of the slide with respect to the drill and yet allow the slide to hold the drill against buckling at the place of penetration and to guide the direction of the end of the drill at the place of penetration. As the drilling continues the drill slides lengthwise in the non-rotating slide 21' that is held by the fingers of the operator and the slide thereby guides the drill against buckling or bowing at the place of entrance of the drill into the human body.

In compliance with the requirements of the patent statutes there have here been shown and described preferred embodiments of the present invention. It is however to be understood that the invention is not limited to the precise constructions herein shown, the same being merely illustrative of the principles of the invention. What is considered new and sought to be secured by Letters Patent is:

A surgical apparatus for forming a deep penetration into a body under sterile conditions, said apparatus having a hub, a body-penetrating element secured to said hub and having a penetrating end remote from said hub, said body-penetrating element being of sufficient thinness in relation to its length to be subject to possible buckling when subjected to compression during its penetrating operation, and a guide for preventing misdirection of the body penetrating element due to buckling during its body-penetrating operation, said guide comprising a generally cylindrical bushing open at one end and having at its opposite end a closure with a centrally located axially extending bore therethrough and through which bore the body-penetrating element extends, said bore making a snug fit on the body-penetrating element while permitting longitudinal sliding of the body-penetrating element therethrough, the opening in the open end of said bushing comprising an axial bore contiguous with and of greater axial extent than said first-mentioned bore and facing said hub, and being of sufficient size to enable it to receive the end of the hub whereby the bushing may be telescoped over the end of the hub, said bushing having a maximum width substantially the width of said hub and the entire bushing being of a length which is a minor fractional part of the length of the body penetrating element and said second bore having an axial length which is a major fractional part of the length of the bushing, the part of the bushing around said bores forming a peripheral wall which provides a lateral finger-gripping portion to enable digital gripping pressure to be applied to the wall and in a direction radially inwardly toward the bores to hold the guide in place with said axially extending bore adapted to be accurately disposed at any desired angular position with respect to a patient's body during the body-penetrating operation.

References Cited in the file of this patent

UNITED STATES PATENTS

| | | |
|---|---|---|
| 1,774,707 | Gau | Sept. 2, 1930 |
| 2,238,323 | Hollingsworth | Apr. 15, 1941 |
| 2,338,800 | Burke | Jan. 11, 1944 |

FOREIGN PATENTS

| | | |
|---|---|---|
| 261,132 | Germany | June 18, 1913 |
| 123,520 | Great Britain | Aug. 6, 1919 |
| 551,044 | France | Dec. 26, 1922 |
| 646,559 | Germany | June 17, 1937 |
| 488,003 | Italy | Dec. 14, 1953 |